(12) United States Patent
Straub et al.

(10) Patent No.: US 9,296,258 B2
(45) Date of Patent: Mar. 29, 2016

(54) AXLE SHAFT AND ASSEMBLY

(71) Applicant: Sypris Technologies, Inc., Louisville, KY (US)

(72) Inventors: Stephen W. Straub, Louisville, KY (US); Patrick T. Maled, New Albany, IN (US)

(73) Assignee: Sypris Technologies, Inc., Louisville, KY (US)

( * ) Notice: Subject to any disclaimer, the term of this patent is extended or adjusted under 35 U.S.C. 154(b) by 190 days.

(21) Appl. No.: 14/037,426

(22) Filed: Sep. 26, 2013

(65) Prior Publication Data

US 2015/0084399 A1    Mar. 26, 2015

(51) Int. Cl.
| | |
|---|---|
| *B60B 35/00* | (2006.01) |
| *B60B 35/12* | (2006.01) |
| *B60B 27/06* | (2006.01) |
| *F16D 1/108* | (2006.01) |
| *F16D 1/10* | (2006.01) |

(52) U.S. Cl.
CPC ............... *B60B 35/12* (2013.01); *B60B 27/06* (2013.01); *B60B 27/065* (2013.01); *F16D 1/108* (2013.01); *B60B 2360/102* (2013.01); *B60B 2360/143* (2013.01); *B60B 2360/1442* (2013.01); *B60B 2900/112* (2013.01); *B60B 2900/311* (2013.01); *B60Y 2200/10* (2013.01); *F16D 2001/102* (2013.01)

(58) Field of Classification Search
CPC .......... B60B 37/00; B60B 27/02; B60B 27/06
USPC ........ 301/1, 124.1, 111.05, 111.04, 126, 132, 301/122
See application file for complete search history.

(56) References Cited

U.S. PATENT DOCUMENTS

| | | | | |
|---|---|---|---|---|
| 2,439,012 | A | * | 4/1948 | Ledford ............................. 301/1 |
| 2,455,216 | A | * | 11/1948 | Blanton .......................... 403/84 |
| 3,017,207 | A | * | 1/1962 | Lloyd ................................ 403/1 |
| 4,213,351 | A | | 7/1980 | Rowlinson |
| 4,266,646 | A | | 5/1981 | Telford |
| 4,943,182 | A | | 7/1990 | Hoblingre |
| 5,005,913 | A | | 4/1991 | Kittle et al. |
| 5,213,250 | A | | 5/1993 | Simon |
| 5,222,786 | A | * | 6/1993 | Sovis et al. .............. 301/111.05 |
| 6,059,378 | A | | 5/2000 | Dougherty et al. |

(Continued)

FOREIGN PATENT DOCUMENTS

| | | |
|---|---|---|
| CN | 202451622 U | 9/2012 |
| DE | 102011109705 A1 | 2/2013 |

(Continued)

OTHER PUBLICATIONS

European Search Report, Application No. EP 14186561, dated Feb. 5, 2015.

*Primary Examiner* — Hau Phan
(74) *Attorney, Agent, or Firm* — MacMillan, Sobanski & Todd, LLC (57) ABSTRACT

An axle shaft has radially outwardly extending drive fingers which drivingly engage drive slots in a wheel hub cover. The hub cover is rigidly secured to a wheel hub and maintains the axial position of the axle shaft. A shock absorber may be positioned between the drive fingers and the drive slots. The axle shaft may be formed from a hollow tube or a solid shaft by cutting an end portion of the shaft and deforming a cut section radially outwardly to form a drive finger.

14 Claims, 10 Drawing Sheets

(56) References Cited

U.S. PATENT DOCUMENTS

| | | | |
|---|---|---|---|
| 6,065,893 A * | 5/2000 | Montanez, Jr. .................. 403/1 |
| 6,099,083 A | 8/2000 | Logan |
| 6,102,489 A | 8/2000 | Boese et al. |
| 6,254,196 B1 | 7/2001 | Gee |
| 6,467,853 B1 | 10/2002 | Swartzendruber et al. |
| 6,572,199 B1 * | 6/2003 | Creek et al. ................ 301/124.1 |
| 6,802,570 B2 * | 10/2004 | McPherson et al. ..... 301/111.04 |
| 7,699,405 B2 | 4/2010 | Gradu et al. |
| 8,137,000 B2 | 3/2012 | Stephan et al. |
| 8,398,493 B2 | 3/2013 | Dullenkopf et al. |
| 2004/0232760 A1 | 11/2004 | Porter et al. |
| 2014/0241795 A1 | 8/2014 | Hebenstreit et al. |

FOREIGN PATENT DOCUMENTS

| | | |
|---|---|---|
| EP | 0334704 A1 | 9/1989 |
| EP | 1180610 A2 | 2/2002 |
| WO | 2009140996 A1 | 11/2009 |

* cited by examiner

AXLE SHAFT AND ASSEMBLY

BACKGROUND OF THE INVENTION

This invention relates in general to vehicle axles and more particularly to wheel drive axles.

Axle shafts are used to connect a driving and a driven member, such as the differential of an automotive vehicle and a driven wheel. Axle shafts, particularly for automotive vehicles, typically are formed of solid metal shafts with their opposite ends formed for connecting to the drive and driven members of the vehicle. For example, a flange may be forged or welded onto one end of the shaft for connection to a wheel hub, while the opposite end of the shaft may be provided with a spline for connection to a differential gear. Because such shafts must transmit considerable torque and are subjected to rapid starts and stops of power transmission, they must be rigid and strong enough to perform under both normal and overload conditions. Typically, axle shafts are formed from solid steel bar or rod to provide the required strength and rigidity.

In an effort to reduce cost and weight, hollow axle shafts have been used in the past with a wheel driving flange friction welded to the outer or wheel end of the shaft and a spline provided on the opposite end by a cutting, broaching or similar process. Unfortunately, much of the cost benefit of using a hollow shaft is lost using a typical friction welding process to attach a wheel driving flange. Wheel driving flanges have been connected to hollow shafts through splines, but these designs have been complicated and not viable due to the structural problems in strength and rigidity and maintaining the axial position of the wheel driving flange.

It would be desirable to provide a simple lightweight shaft with a wheel drive flange which can be cost effectively manufactured and which provides sufficient rigidity and torque carrying capacity.

SUMMARY OF THE INVENTION

This invention relates an axle shaft having a radially outwardly extending drive finger or fingers which are configured to drivingly engage a wheel hub. Preferably, the wheel hub includes a rigidly secured hub cover having drive slots which drivingly engage the drive fingers. A shock absorber may be positioned between the drive fingers and the drive slots. The hub cover may also maintain the axial position of the shaft.

The axle shaft may be formed from a hollow tube or a solid shaft by cutting an end and bending a cut section radially outwardly to form a drive finger. In a preferred embodiment, four equally circumferentially spaced drive fingers are formed.

Various aspects of this invention will become apparent to those skilled in the art from the following detailed description of the preferred embodiments, when read in light of the accompanying drawings.

DETAILED DESCRIPTION OF PREFERRED EMBODIMENTS

Figure 1:
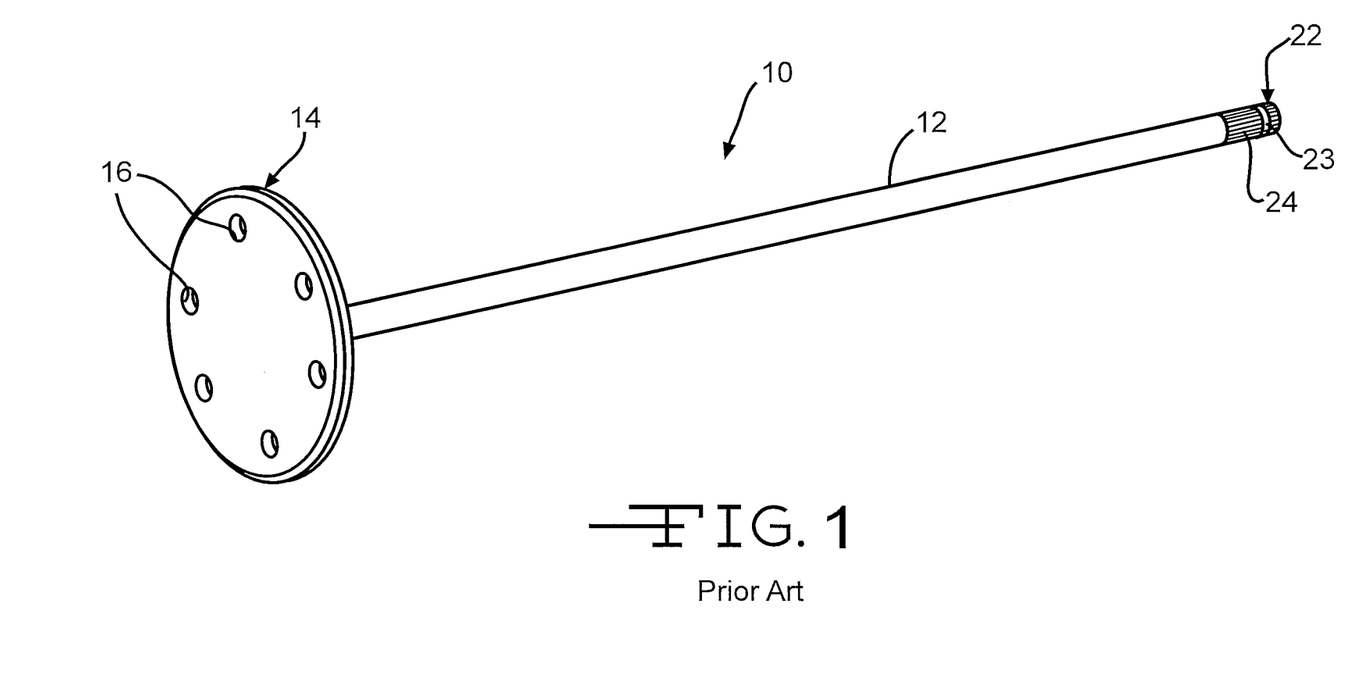
FIG. 1 is a perspective view of a prior art axle shaft.

Referring to FIG. 1, a typical prior art vehicle axle shaft 10 is formed from a solid steel bar or rod 12. The shaft 12 has a spline end portion 22. Splines 24 typically are formed through a cutting or rolling process. The splines drivingly engage a differential gear of a vehicle. An annular groove 23 is provided to accept a clip for axial retention of the shaft 12 within a differential gear. A wheel drive flange 14 is provided on the opposite end portion of the shaft 12. The flange 12 may be forged onto the end of the shaft or attached through a process such as friction welding. The flange 14 includes bolt holes 16 to facilitate attachment of the shaft to a wheel hub.

Figure 2:
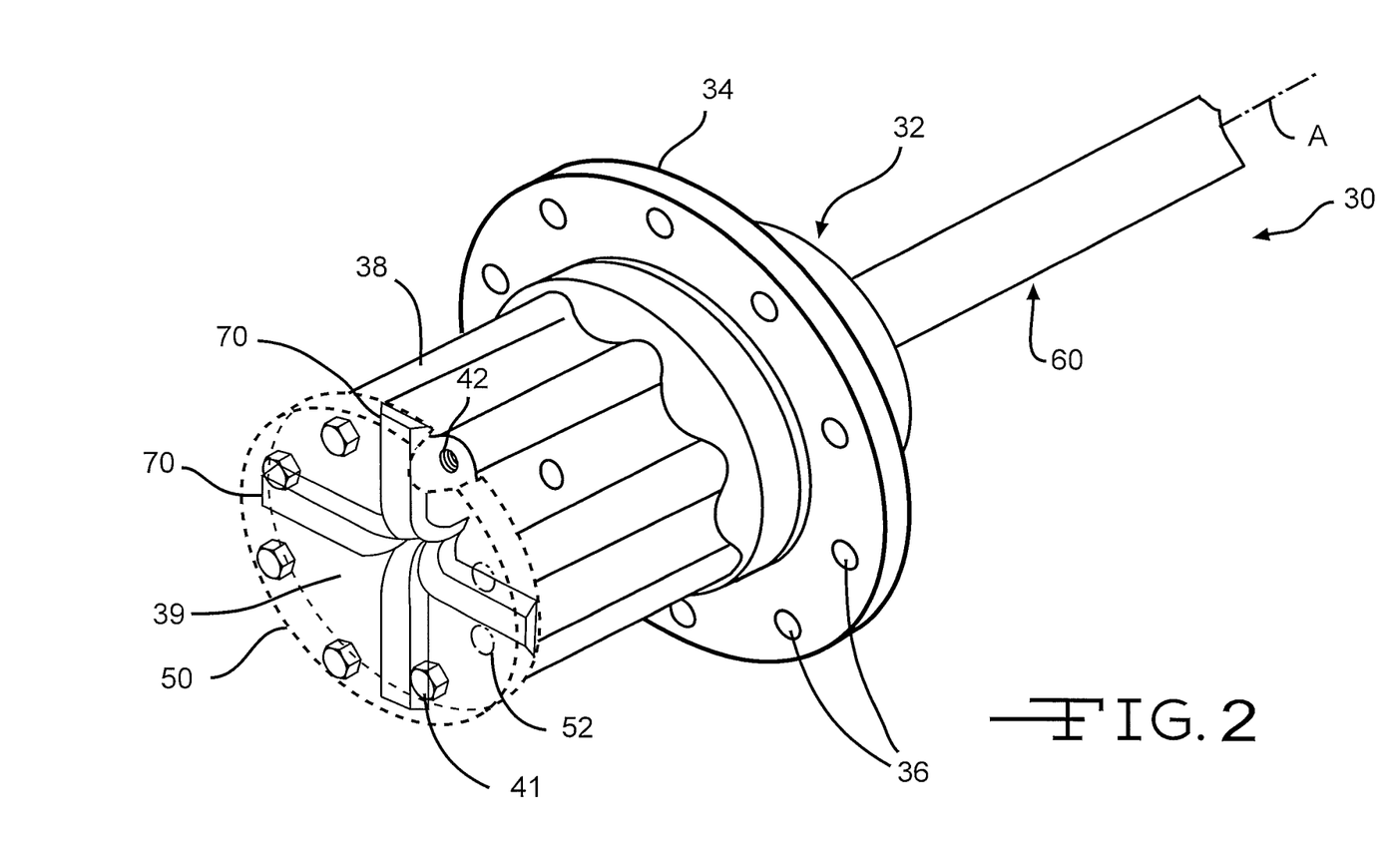
FIG. 2 is a perspective view of an axle shaft of the present invention, shown with a wheel hub, and a hub cover shown in phantom.

FIG. 2 shows a wheel end assembly 30 utilizing the present invention. The assembly 30 includes a wheel hub 32. An axle shaft 60 extends along a longitudinal or rotational axis A through the hub 32. The hub 32 includes a wheel mounting plate 34 having threaded bolt holes 36 for attaching a vehicle wheel. A hub housing 38 contains bearings and lubricant, as is well known in the art. The hub housing 38 has an open end 39 which is sealed by a hub cover 50. The hub cover 50 drivingly engages drive fingers 70 on the axle shaft as will be explained in detail below. The housing 38 has eight axially extending threaded holes 42. Eight bolts 41 extend through eight bolt holes 52 in the cover 50 and are threaded into the eight threaded bolt holes 42 to secure the cover 50 to the housing 38. Of course, the number of bolts 41 may vary according to the vehicle and axle designs.

Figure 3:
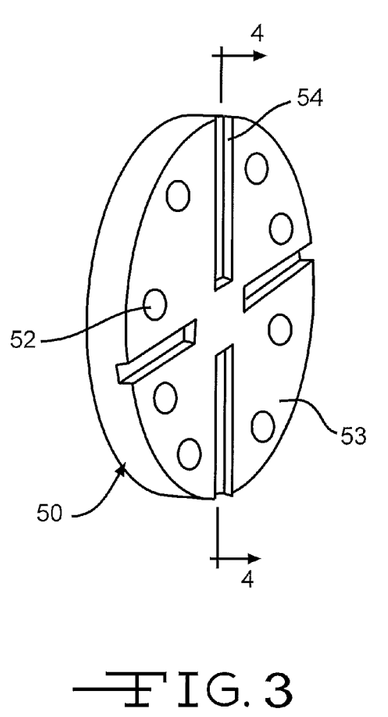
FIG. 3 is a perspective view of the hub cover of FIG. 2.
Figure 4:
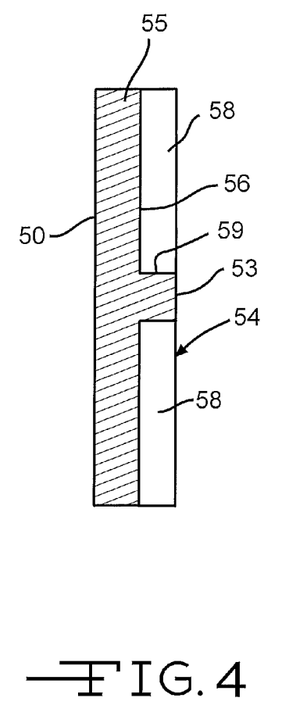
FIG. 4 is a cross-sectional side view of the hub cover of FIG. 3 taken long line 4-4.

Referring to FIGS. 3 and 4, the hub cover 50 has an axially inner surface 53 which sealingly engages the hub housing 38 near the outer periphery of the hub. The inner surface 53 defines four radially extending drive slots 54. The drive slots 54 may be forged or cut into the hub cover 50. The drive slots 54 are equally circumferentially spaced about the inner surface 53. Each drive slot 54 has a bottom surface 56 for engagement with an outer surface of a drive finger 70 and two opposed and radially extending drive surfaces 58 for engagement with corresponding drive surfaces of the drive finger as will be explained below. The slots 54 extend from a radially inner wall 59 near the center of the hub cover 50 to the outer periphery 55.

Figure 3A:
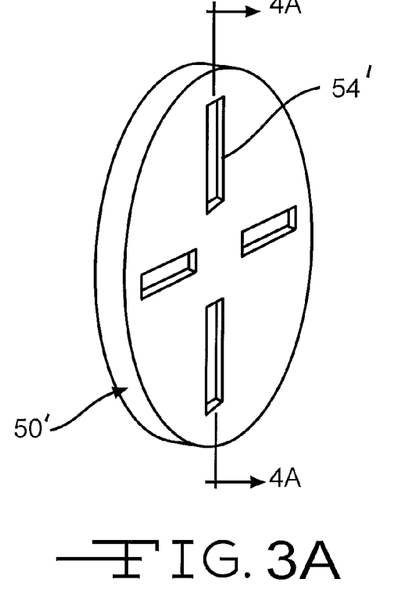
FIG. 3A is a perspective view of an alternative hub cover.
Figure 3B:
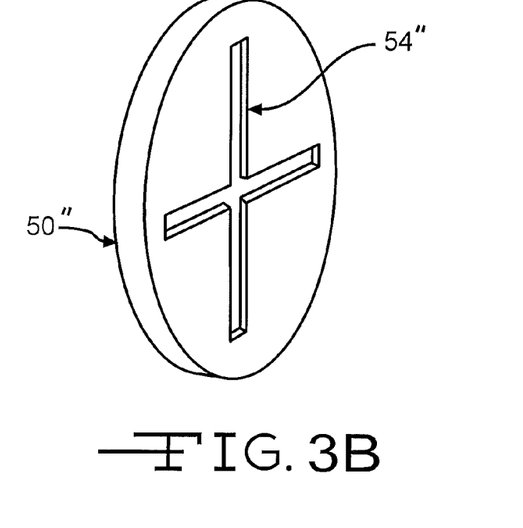
FIG. 3B is a perspective view of a second alternative hub cover.
Figure 4A:
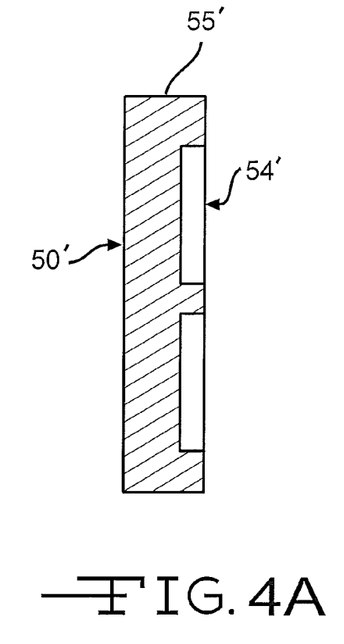
FIG. 4A is a cross-sectional side view of the hub cover of FIG. 3A taken long line 4A-4A.

Referring to FIGS. 3A and 4A, for some applications, it may be desirable to have the drive slots 54' extend radially outwardly a length short of the outer periphery 55' of the hub cover 50'. Such a design may in some applications allow the hub housing 38 to be more readily sealed by the hub cover 50'. Referring to FIG. 3B, for easier fabrication, it may be desirable to eliminate the inner walls 59 by extending diametrically opposed or coaxial slots into each other. In other words, slots 54" extend completely across the inner surface of the hub cover 50", creating two intersecting slots 54", each of which would engage two drive fingers 70. A gasket or O-ring may be provided between the hub cover and the hub for sealing.

Figure 5:
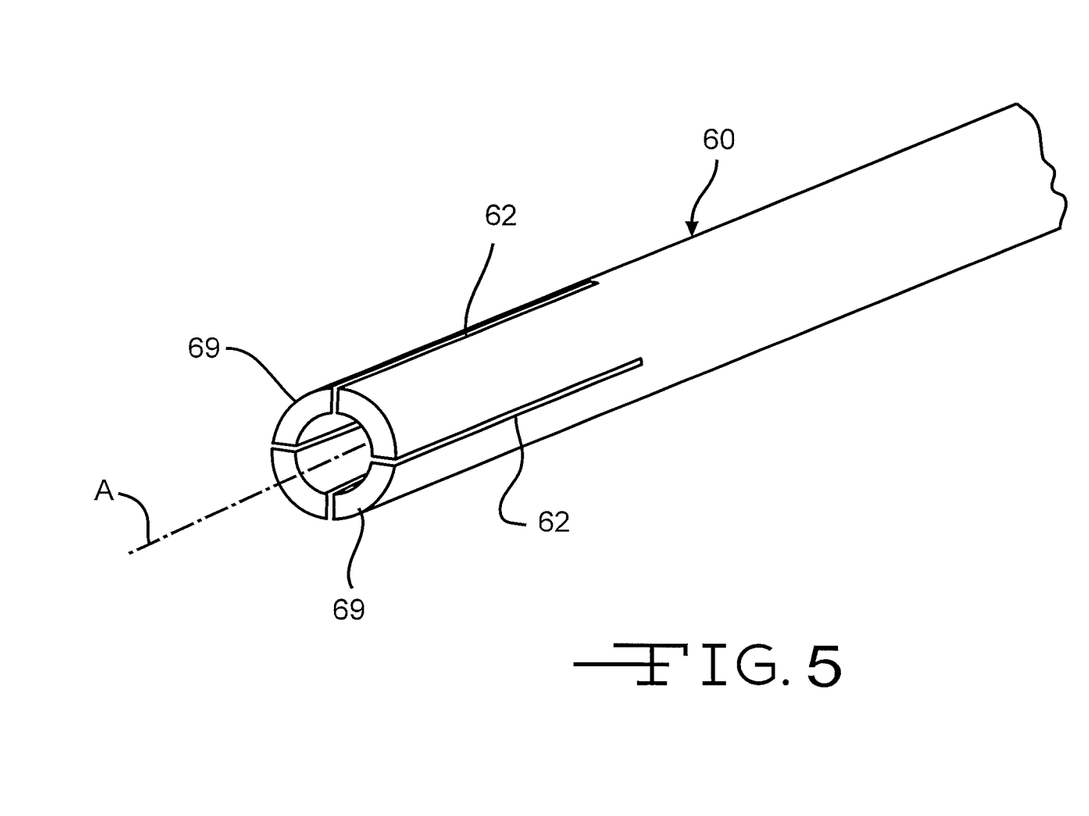
FIG. 5 is a perspective view of a hollow shaft used to make the axle shaft of FIG. 2.

Referring to FIG. 5, an unhardened hollow shaft or tube 60 has a longitudinal or rotational axis A. The shaft 60 preferably is formed from AISI 1541 or similar steel, but may be formed from any suitable material, such as ionconel, for example. One end portion of the tube 60 is provided with a spline (not shown) for connection to a differential gear. The spline may be formed in any conventional manner. The opposite end portion of the tube 60 has four equally circumferentially spaced slots 62. The slots may be cut into the tube 60 in any conventional manner, such as with a cutting tool, a laser, etc. The slots 62 define cut segments 69 which will form the drive fingers 70. After cutting the tube 60, the cut segments 69 are bent radially outwardly approximately 90 degrees into an upright position relative to the shaft axis A. The bending may be done by any suitable process, such as rolling, as will be apparent to those skilled in the art. The disclosed embodiment has four cut segments 69 and drive fingers 70, but any number of fingers may be used, depending on the vehicle application, torque, speed, shock load requirements, etc.

Figure 6:
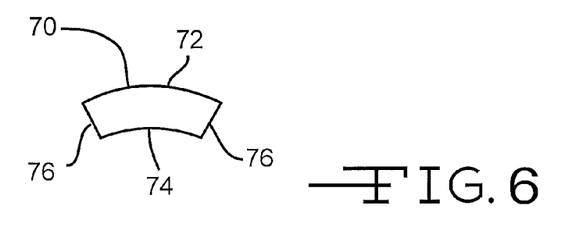
FIG. 6 is a plan view of the tip of a drive finger of FIG. 5 prior to deformation into a final shape.

Referring to FIG. 6, the bending process will result in each drive finger 70 having a radially extending and axially facing inner surface 72 which has the curvature of the outer surface of the tube 60, and a radially extending and axially facing outer surface 74 which has the curvature of the inner surface of the tube 60. Each drive finger 70 will have opposed radially extending and generally circumferentially facing drive surfaces 76. The drive surfaces 76 are the surfaces of the tube where the cuts were made. Drive surfaces 76 are planar or flat but are oriented at an oblique angle transverse to the shaft axis A. The drive surfaces 76 of each drive finger 70 could be further deformed or cut to be parallel with each other if desired for any particular application. Hardening may or may not be required or desirable after the fingers 70 are formed into a near final shape. If required or desired, hardening may be accomplished by any known process such as induction hardening or carburization. A final machining step may be required to give the fingers 70 a final shape.

Figure 7:
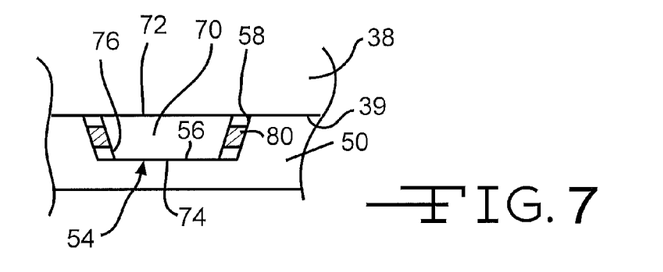
FIG. 7 is a plan view of a drive finger of FIG. 2 in engagement with the hub cover.

Referring to FIG. 7, each drive finger 70 is positioned in a corresponding drive slot 54 of the hub cover 50. An optional shock absorber 80 is provided between each drive finger drive surface 76 and the corresponding hub cover slot drive surface 58. The shock absorber 80 is an elastomeric member molded to or adhered to the drive finger drive surface 76. Of course, the shock absorber 80 may also be molded into or adhered to the hub cover drive surface 58. The shock absorber 80 may have any size or shape as required for any particular application. For example, the shock absorber 80 may extend completely around the finger 70 and extend the complete length of the finger 70. Similarly, the shock absorber may completely line the hub cover slot 54. Of course, other types of shock absorbers may be used, such as a spring.

When the hub cover 50 is assembled onto the hub 32, the outer surface 74 of each drive finger 70 is in contact with the bottom surface 56 of the corresponding drive slot 54 and the inner surface 72 of each drive finger 70 is in contact with the outer surface 39 of the hub housing 38. The drive fingers 70, and therefore the axle shaft 60, thereby are held in an axial position by the hub cover 50 and hub housing 38. The drive fingers 70 are not directly bolted to the hub cover or hub housing and therefore have no bolt apertures.

Figure 8:
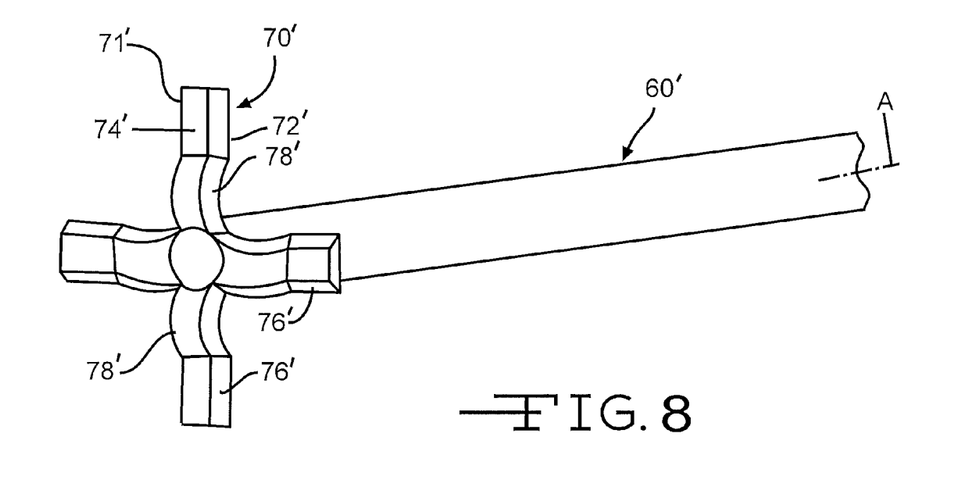
FIG. 8 is a perspective view of an alternative embodiment of the axle shaft of FIG. 2.

FIG. 8 shows an alternative axle shaft 60' formed form a hollow shaft. The initial rolling process used to bend the drive fingers 70' radially outwardly leaves each drive finger in a curved configuration. A secondary straightening process is utilized to form the radially outward tips 71' of each drive finger into the cross-sectional shape of the drive fingers 70 shown in FIG. 7, with flat axially facing inner 72' and outer 74' surfaces. Drive surfaces 76' may extend at an oblique angle relative to the shaft axial A, or may be deformed or machined to be parallel to each other. It may not be necessary to straighten the entire drive finger 70', leaving a curved intermediate section 78' positioned readily inwardly of the drive finger tips 71'. Of course, the hub cover slots would have to accommodate the additional axial depth of the intermediate curved portion 78'.

Figure 9:
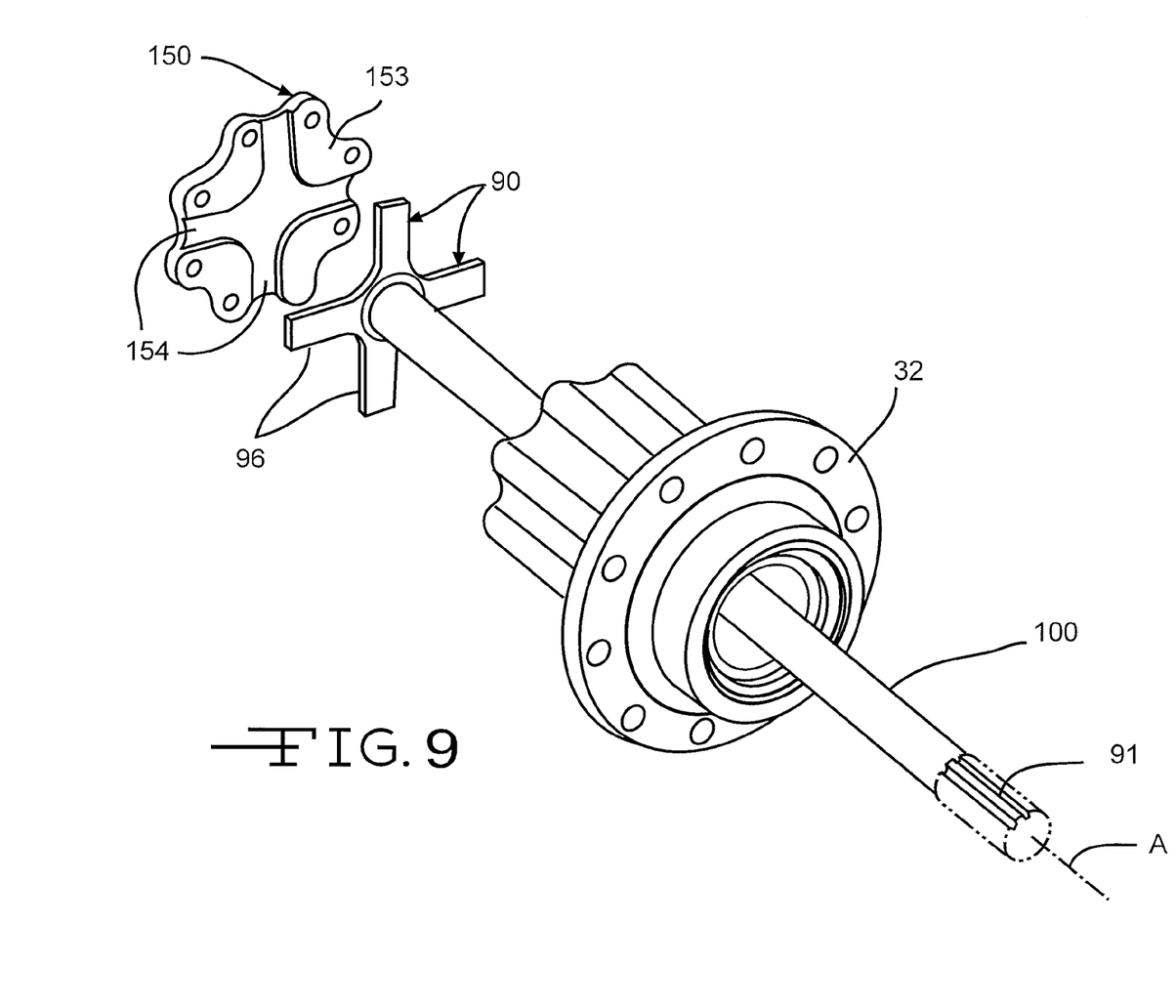
FIG. 9 is an exploded perspective view of an alternative embodiment of the present invention utilizing a solid axle shaft.

FIG. 9 shows an alternative embodiment of the present invention in which an axle shaft 100 is formed from an unhardened bar or rod of AISI 1541 steel or any other suitable material. One end portion of the shaft 100 is provided with a spline 91 for connection to a differential gear. The spline may be formed in any conventional manner. The opposite end portion of the shaft 100 is provided with four radially extending and equally circumferentially spaced drive fingers 90. The drive fingers 90 are formed utilizing a forging process in which the solid rod or bar is forged into a near net configuration with integral drive fingers 90 at one end. A machining operation may be required to give the fingers 90 a desired final shape. Optionally, the shaft may be hardened using any known process. A final machining step may be required after hardening to give the fingers 90 a final shape after hardening. It is preferred for this embodiment that the radially extending drive surfaces 96 are parallel to each other and perpendicular to the shaft axis A'.

Figure 9A:
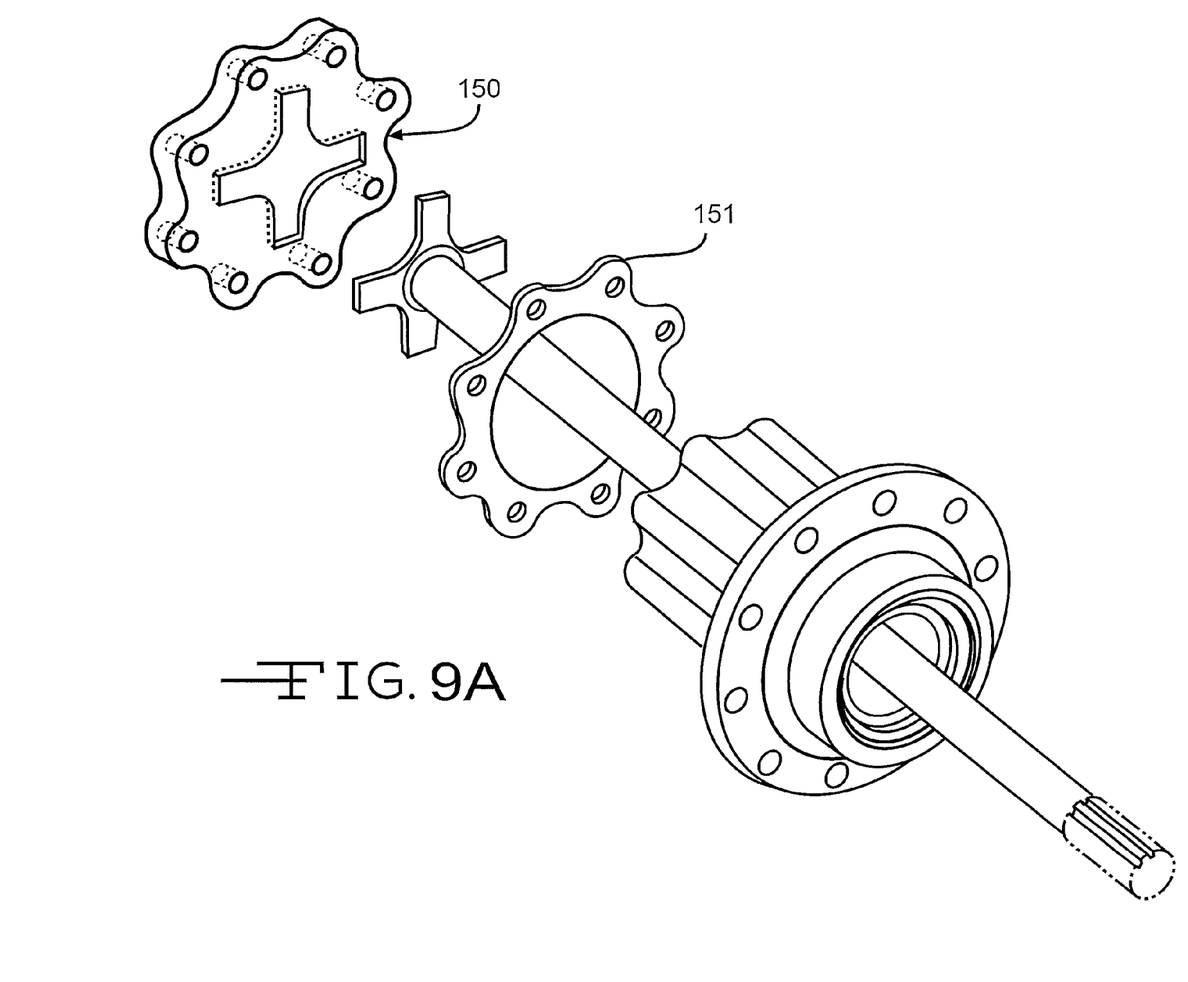
FIG. 9A is an exploded perspective view of a second alternative embodiment of the present invention utilizing a solid axle shaft.

FIG. 9A shows an alternative embodiment of the hub cover 150' in which the drive slots do not extend to the periphery radially outer periphery. This allows for better hub cover contact with the gasket 151. Of course, an O-ring or other sealing device may be used.

The hub cover 150 has drive slots 154 for drivingly engaging the drive fingers 90. Because the drive fingers 90 have been forged, the drive slots 154 are essentially joined into a single channel in the hub cover surface 153, the channel having four radially extending grooves to match the configuration of the drive fingers 90. The hub cover 50' has a scalloped outer periphery to match the scalloped shape of the hub housing and to reduce weight and material.

Figure 10:
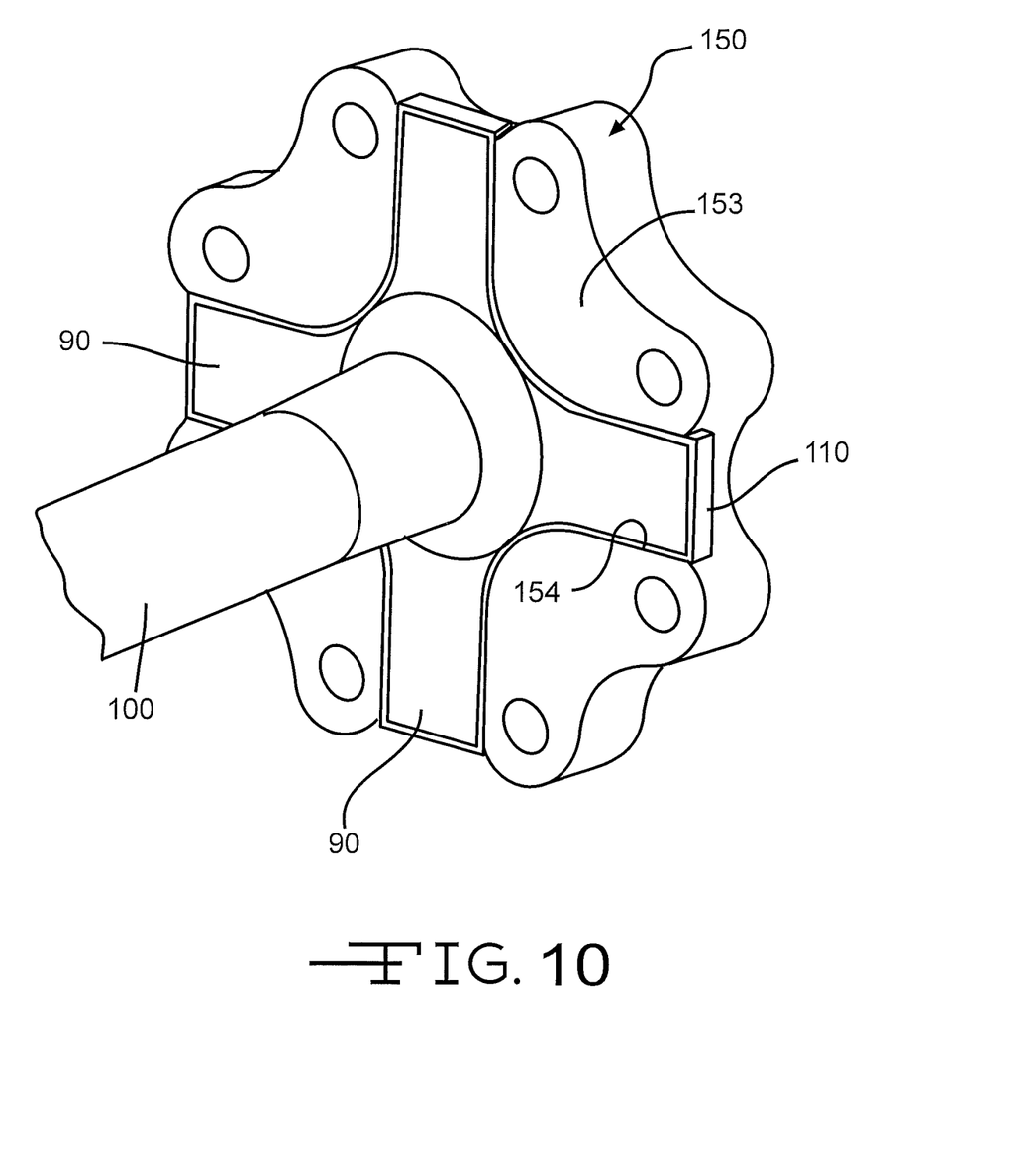
FIG. 10 is a perspective view of a the axle shaft and hub cover of FIG. 9 with an optional shock absorber.

FIG. 10 shows an enlarged view of the shaft 100 with the drive fingers 90 drivingly engaged with the hub cover 150. A shock absorber 110 in the form of an elastomeric bushing is positioned between the drive fingers 90 and the drive surfaces of the hub cover slots 154. The bushing 110 is a one-piece molded unit which is inserted into the slots 154 prior to insertion of the drive fingers 90. Alternatively, the bushing 110 can be molded or adhered to the drive fingers 90 or to the hub cover slots 154. Of course, alternative shock absorbers may be used as well, such as springs.

Figure 11:
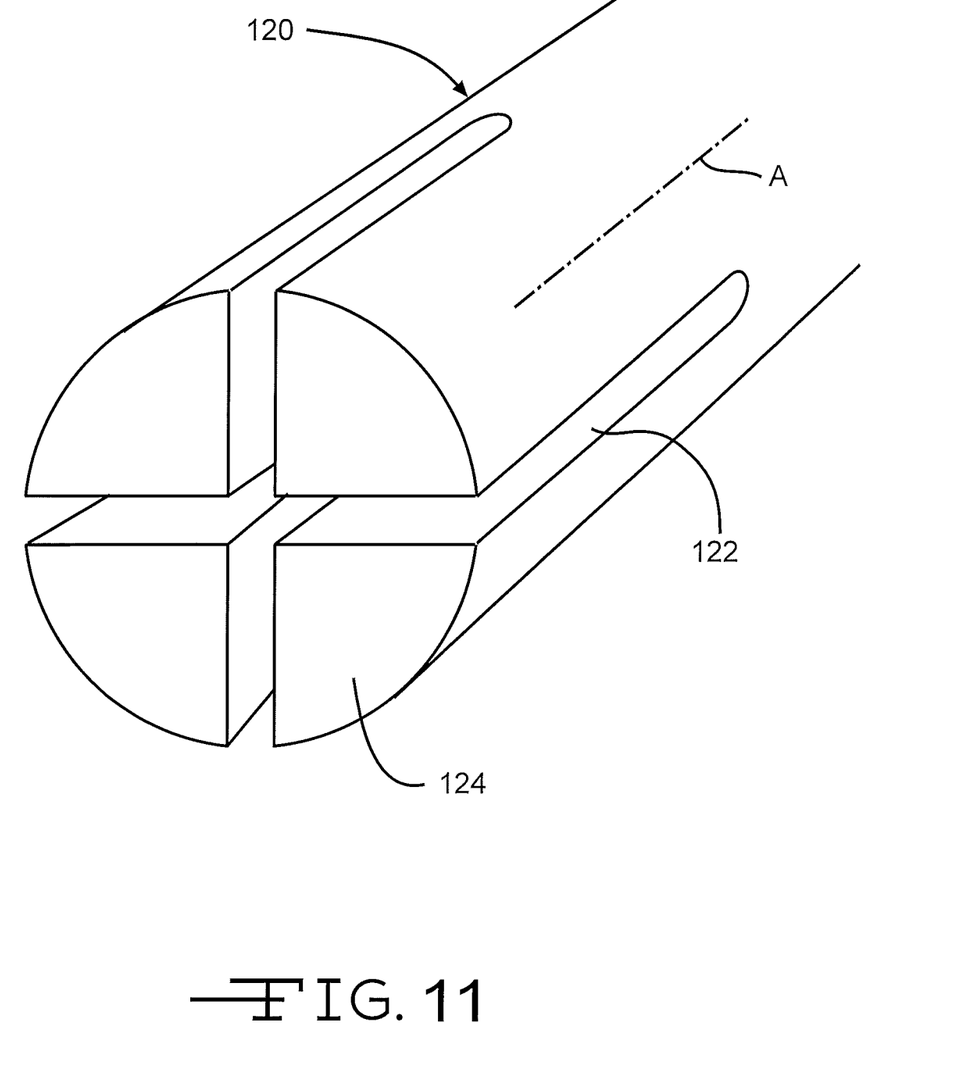
FIG. 11 is perspective view of a solid shaft used to make the axle shaft of FIG. 9 with an alternative method.

FIG. 11 shows an alternative method of making an axle shaft of the present invention. Axle shaft 120 is formed from an unhardened bar of rod of AISI 1541 or similar steel. An end of the shaft has four equally circumferentially spaced slots 122. The slots may be cut in any conventional manner, such as with a cutting tool, a laser, etc. The slots 122 define four drive fingers 124. After cutting, the fingers 124 are bent radially outwardly into an upright position 90 degrees from the shaft axis A. Bending may be done by any suitable process, such as rolling, as will be apparent to those skilled in the art. The fingers 124 are then deformed into a desired cross-sectional shape, such as a rectangular shape or a trapezoidal shape similar to that of the drive finger 70 of FIG. 7. After the fingers 124 are formed into their final shape, the shaft is hardening through a carburizing and quenching process as is well known in the art. A final machining step may be required after hardening to give the fingers 124 a final shape.

The present invention may be particularly useful for on-highway heavy duty trucks. A conventional solid axle for such an application has an outer diameter of about 1.87 inches and a length of about 40 inches. A typical hub has an outer diameter of about 8.5 inches. A hollow axle 60 having an outer diameter of about 1.95 and an inner diameter of about 1.14 inches would provide comparable strength and rigidity. The axial thickness of each drive finger 70 would be approximately 0.40 inches, with a hub cover thickness of about 0.8 inches. A solid shaft axle 100, 120 of the present invention having comparable strength and rigidity could be made having the same approximately 1.87 inch outer diameter. With either a hollow or solid shaft, the hub cover diameter would be about 8.5 inches, with the drive fingers extending radially outwardly approximately 3 inches from the outer surface of the shaft. Of course, the dimensions would change for lighter or heavier applications such as a golf cart or construction equipment. In any event, the radial length of the drive fingers is at least 10% of the maximum outer surface diameter of the shaft from which it extends.

The principle and mode of operation of this invention have been explained and illustrated in the preferred embodiments. However, this invention may be practiced otherwise than as specifically explained and illustrated without departing from its spirit or scope.

What is claimed is:

1. A one-piece axle shaft comprising a longitudinal axis of rotation and first and second axially spaced end portions, the first axle shaft end portion having an outer diameter defining a radially outer surface, wherein the first axle shaft end portion comprises a first drive finger extending radially outwardly directly from the outer surface of the first axle shaft end portion, the drive finger having a radial length and an axial thickness, wherein the radial length of the drive finger from the radially outer surface of the first axle shaft end portion is greater than the axial thickness of the drive finger.

2. An axle shaft as defined in claim 1 wherein the shaft has a maximum radial outer surface cross-sectional thickness dimension, wherein the drive finger radial length is at least 10% of the maximum radial outer surface cross-sectional thickness dimension.

3. An axle shaft as defined in claim 1 wherein the drive finger is a solid member without apertures.

4. An axle shaft as defined in claim 1 wherein the first axle shaft end portion is hollow.

5. An axle shaft as defined in claim 1 wherein the first axle shaft end portion is solid.

6. An axle shaft as defined in claim 1 wherein the first axle shaft end portion further comprises a second drive finger extending radially outwardly from the outer surface of the shaft, the second drive finger circumferentially spaced from the first drive finger.

7. An axle shaft as defined in claim 6 wherein the first axle shaft end portion further comprises a third drive finger and fourth drive finger, each of the third and fourth drive fingers extending radially outwardly from the outer surface of the shaft, wherein each of the first, second, third and fourth drive fingers are equally circumferentially spaced from each other.

8. An axle shaft as defined in claim 1 wherein the shaft has a maximum radial outer surface cross-sectional thickness dimension, wherein the drive finger radial length is at least twice the maximum radial outer surface cross-sectional thickness dimension.

9. An axle shaft assembly comprising: (a) an axle shaft having a longitudinal axis of rotation, and (b) a hub cover drivingly engaging the axle shaft, the hub cover configured for driving connection with a wheel hub and for substantially completely sealing the wheel hub, wherein the shaft comprises a radially extending drive finger, and wherein the hub cover comprises a radially extending drive slot in driving engagement with the drive finger.

10. An axle shaft assembly as defined in claim 9 wherein the hub cover is planar and lies in a plane perpendicular to the longitudinal axis of rotataion.

11. An axle shaft assembly as defined in claim 9 wherein the drive finger extends radially outwardly.

12. An axle shaft assembly as defined in claim 9 wherein the radially extending hub cover drive slot has an axial thickness and wherein the radially extending drive finger has an axial thickness approximately equal to the axial thickness of the radially extending hub cover drive slot.

13. An axle shaft assembly as defined in claim 9 further comprising a shock absorber between the drive finger and the hub cover drive slot.

14. An axle shaft assembly as defined in claim 9 further comprising a wheel hub, the hub cover drivingly engaging the wheel hub, wherein the hub cover has a radially extending slot bottom surface, and wherein the radially extending drive finger has a radially extending outer surface in a plane generally perpendicular to the axis, and wherein the outer surface is in engagement with the slot bottom surface, whereby the drive finger is maintained in a axial position relative to the cover and hub.

* * * * *